US009902507B2

(12) United States Patent
Walker (10) Patent No.: US 9,902,507 B2
(45) Date of Patent: Feb. 27, 2018

(54) ARTIFICIAL SATELLITE AND METHOD FOR FILLING A TANK OF PROPELLENT GAS OF SAID ARTIFICIAL SATELLITE

(71) Applicant: AIRBUS DEFENCE AND SPACE SAS, Les Mureaux (FR)

(72) Inventor: Andrew Nicholas Walker, Pechbusque (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/546,118

(22) PCT Filed: Jan. 22, 2016

(86) PCT No.: PCT/FR2016/050136
§ 371 (c)(1),
(2) Date: Jul. 25, 2017

(87) PCT Pub. No.: WO2016/120547
PCT Pub. Date: Aug. 4, 2016

(65) Prior Publication Data
US 2017/0361951 A1 Dec. 21, 2017

(30) Foreign Application Priority Data

Jan. 27, 2015 (FR) ..................... 15 50613

(51) Int. Cl.
*B64G 1/52* (2006.01)
*B64G 1/50* (2006.01)
(Continued)

(52) U.S. Cl.
CPC ............. *B64G 1/506* (2013.01); *B64G 1/402* (2013.01); *B64G 1/503* (2013.01); *B64G 1/645* (2013.01)

(58) Field of Classification Search
CPC .......... B64G 1/503; B64G 1/506; B64G 1/50; B64G 1/402; B64G 1/645; B64G 1/22;
(Continued)

(56) References Cited

U.S. PATENT DOCUMENTS

| 4,687,048 A * | 8/1987 | Edelstein | ............... B64G 1/503 |
| | | | 165/104.25 |
| 4,880,050 A * | 11/1989 | Nakamura | ............... B64G 1/50 |
| | | | 165/104.14 |

(Continued)

FOREIGN PATENT DOCUMENTS

| JP | 2012192916 A | 10/2012 |
| JP | 6191500 B2 | 9/2017 |
| WO | 20110135230 A1 | 11/2011 |

OTHER PUBLICATIONS

International Search Report, dated May 3, 2016, from corresponding PCT/FR2016/050136 application.

(Continued)

*Primary Examiner* — Medhat Badawi
(74) *Attorney, Agent, or Firm* — Young & Thompson (57) ABSTRACT

Disclosed is artificial satellite including: a mounting structure supporting equipment-bearing walls; a launcher-adapter rigidly connected to the mounting structure; a first radiator; and at least one first system for transporting heat by a fluid, including at least one duct having a first heat-exchange section and a second heat-exchange section, the second heat-exchange section being capable of being in thermal contact with the first radiator. The first heat-exchange section is in thermal contact with at least one portion of the launcher-adapter. Also disclosed is a method for filling a tank of propellant gas of the artificial satellite.

20 Claims, 8 Drawing Sheets

(51) Int. Cl.
*B64G 1/64* (2006.01)
*B64G 1/40* (2006.01)

(58) Field of Classification Search
CPC ......... B64G 1/58; F28D 1/14; F28D 15/0275; F28D 15/0233; F28D 15/0266; F28D 15/043; F28D 2021/0029; F28F 13/00
See application file for complete search history.

(56) References Cited

U.S. PATENT DOCUMENTS

| | | | | |
|---|---|---|---|---|
| 4,899,810 | A * | 2/1990 | Fredley | B64G 1/506 165/104.14 |
| 5,036,905 | A * | 8/1991 | Eninger | B64G 1/50 165/104.26 |
| 5,069,274 | A * | 12/1991 | Haslett | B64G 1/503 165/104.14 |
| 5,117,901 | A * | 6/1992 | Cullimore | B64G 1/50 165/104.26 |
| 5,310,141 | A * | 5/1994 | Homer | B64G 1/425 136/222 |
| 5,332,030 | A * | 7/1994 | Spencer | B64G 1/50 165/274 |
| 5,351,746 | A * | 10/1994 | Mackey | B64G 1/503 165/104.14 |
| 5,494,241 | A * | 2/1996 | Poulain | B64G 1/503 165/41 |
| 5,624,088 | A * | 4/1997 | Fiore | B64G 1/10 244/158.1 |
| 5,682,943 | A * | 11/1997 | Yao | B64G 1/50 165/104.21 |
| 5,687,932 | A * | 11/1997 | Gomes | B64G 1/50 165/104.12 |
| 5,732,765 | A * | 3/1998 | Drolen | B64G 1/50 165/41 |
| 5,735,489 | A * | 4/1998 | Drolen | B64G 1/50 244/171.8 |
| 5,743,325 | A * | 4/1998 | Esposto | B64G 1/22 165/41 |
| 5,787,969 | A * | 8/1998 | Drolen | B64G 1/50 165/104.26 |
| 5,794,890 | A * | 8/1998 | Jones, Jr. | B64G 1/503 16/280 |
| 5,806,800 | A * | 9/1998 | Caplin | B64G 1/503 165/41 |
| 5,806,803 | A * | 9/1998 | Watts | B64G 1/503 165/41 |
| 5,823,477 | A * | 10/1998 | York | B64G 1/503 165/171 |
| 5,833,175 | A * | 11/1998 | Caplin | B64G 1/10 244/158.1 |
| 5,870,063 | A * | 2/1999 | Cherrette | B64G 1/1007 342/354 |
| 5,884,868 | A * | 3/1999 | Long | B64G 1/226 244/171.8 |
| 5,957,408 | A * | 9/1999 | Hall | B64G 1/425 165/42 |
| 6,003,817 | A * | 12/1999 | Basuthakur | B64G 1/50 244/164 |
| 6,073,887 | A * | 6/2000 | Hosick | B64G 1/50 244/164 |
| 6,073,888 | A * | 6/2000 | Gelon | B64G 1/50 165/104.22 |
| 6,080,962 | A * | 6/2000 | Lee | B64G 1/10 165/41 |
| 6,166,907 | A * | 12/2000 | Chien | F28D 1/0478 165/104.33 |
| 6,378,809 | B1 * | 4/2002 | Pon | B64G 1/503 244/171.8 |
| 6,439,297 | B1 * | 8/2002 | Dunbar | B64G 1/50 165/41 |
| 6,478,258 | B1 * | 11/2002 | Yee | B64G 1/503 165/41 |
| 6,776,220 | B1 * | 8/2004 | Low | B64G 1/506 165/104.33 |
| 6,857,602 | B1 * | 2/2005 | Grosskrueger | B64G 1/506 165/41 |
| 6,883,588 | B1 * | 4/2005 | Low | B64G 1/50 126/613 |
| 7,048,233 | B2 * | 5/2006 | Combes | B64G 1/50 165/41 |
| 7,080,681 | B2 * | 7/2006 | Wert | F28D 15/025 165/104.21 |
| 7,143,813 | B2 * | 12/2006 | Delgado, Jr. | F28D 15/0275 165/104.21 |
| 7,513,462 | B1 * | 4/2009 | McKinnon | B64G 1/1007 244/173.1 |
| 8,616,271 | B2 * | 12/2013 | Hugon | B64G 1/50 165/104.25 |
| 9,064,852 | B1 * | 6/2015 | Hardesty | H01L 21/4871 |
| 9,446,863 | B2 * | 9/2016 | Cheynet de Beaupre | B64G 1/10 |
| 2002/0145082 | A1 * | 10/2002 | Bertheux | B64G 1/503 244/172.6 |
| 2002/0153128 | A1 * | 10/2002 | Low | F02G 5/02 165/51 |
| 2003/0066638 | A1 * | 4/2003 | Qu | C09K 5/14 165/186 |
| 2004/0040691 | A1 * | 3/2004 | Jacque | B64G 1/506 165/42 |
| 2004/0182550 | A1 * | 9/2004 | Kroliczek | F25B 23/006 165/104.28 |
| 2004/0188568 | A1 * | 9/2004 | Gayrard | B64G 1/506 244/171.8 |
| 2004/0232284 | A1 * | 11/2004 | Tjiptahardja | B64G 1/503 244/171.8 |
| 2005/0023415 | A1 * | 2/2005 | Walker | B64G 1/222 244/171.8 |
| 2005/0166399 | A1 * | 8/2005 | Kroliczek | F25B 23/006 29/890.07 |
| 2005/0211850 | A1 * | 9/2005 | Sebata | B64G 1/503 244/171.8 |
| 2007/0017722 | A1 * | 1/2007 | St. Louis | B60V 1/04 180/116 |
| 2007/0107441 | A1 * | 5/2007 | Lee | F25B 21/02 62/3.7 |
| 2007/0175610 | A1 * | 8/2007 | Yeh | H01L 23/473 165/80.4 |
| 2007/0221787 | A1 * | 9/2007 | McKinnon | B64G 1/222 244/171.8 |
| 2008/0128114 | A1 * | 6/2008 | Lai | G06F 1/20 165/80.4 |
| 2008/0143636 | A1 * | 6/2008 | Couchman | B64G 1/66 343/915 |
| 2008/0206534 | A1 * | 8/2008 | Brooks | B32B 17/10018 428/220 |
| 2009/0080155 | A1 * | 3/2009 | Takahashi | H01L 23/427 361/695 |
| 2009/0090490 | A1 * | 4/2009 | Yoshida | H01L 23/4735 165/104.33 |
| 2009/0200006 | A1 * | 8/2009 | Kroliczek | F25B 23/006 165/274 |
| 2010/0001141 | A1 * | 1/2010 | Jondeau | B64G 1/50 244/158.1 |
| 2010/0019093 | A1 * | 1/2010 | Russell | B64D 47/00 244/171.8 |
| 2010/0101762 | A1 * | 4/2010 | Kroliczek | F28D 15/043 165/104.26 |
| 2010/0243817 | A1 * | 9/2010 | McKinnon | B64G 1/50 244/171.8 |
| 2011/0179806 | A1 * | 7/2011 | Ipposhi | F28D 15/0266 62/3.3 |
| 2013/0112374 | A1 * | 5/2013 | Murray | B64D 33/12 165/104.26 |
| 2013/0200220 | A1 * | 8/2013 | Goodzeit | B64G 1/222 244/171.8 |
| 2013/0200221 | A1 * | 8/2013 | Goodzeit | B64G 1/58 244/171.8 |

(56) References Cited

U.S. PATENT DOCUMENTS

| | | | | |
|---|---|---|---|---|
| 2013/0233515 A1* | 9/2013 | Aston | .................... | B64G 1/503 |
| | | | | 165/104.21 |
| 2013/0233516 A1* | 9/2013 | Aston | .................... | B64G 1/503 |
| | | | | 165/104.21 |
| 2014/0083651 A1* | 3/2014 | Chaix | .................... | F28D 15/02 |
| | | | | 165/104.21 |
| 2014/0224939 A1* | 8/2014 | Wong | .................... | B64G 1/506 |
| | | | | 244/171.8 |
| 2014/0268553 A1* | 9/2014 | Van Pelt | ............ | H05K 7/20809 |
| | | | | 361/679.52 |
| 2014/0299714 A1* | 10/2014 | Wong | ....................... | B64G 1/44 |
| | | | | 244/171.8 |
| 2016/0311561 A1* | 10/2016 | Lemaire | .................. | B64G 1/44 |
| 2016/0325856 A1* | 11/2016 | Hache | .................. | B64G 1/1007 |

OTHER PUBLICATIONS

Dec. 26, 2017, JP communication issued for related JP application No. 2017-539323.

\* cited by examiner

ARTIFICIAL SATELLITE AND METHOD FOR FILLING A TANK OF PROPELLENT GAS OF SAID ARTIFICIAL SATELLITE

The invention relates to the technical field of artificial satellites, and more specifically the mispointing of antenna reflectors and the storing of propellant gas.

Figure 1:
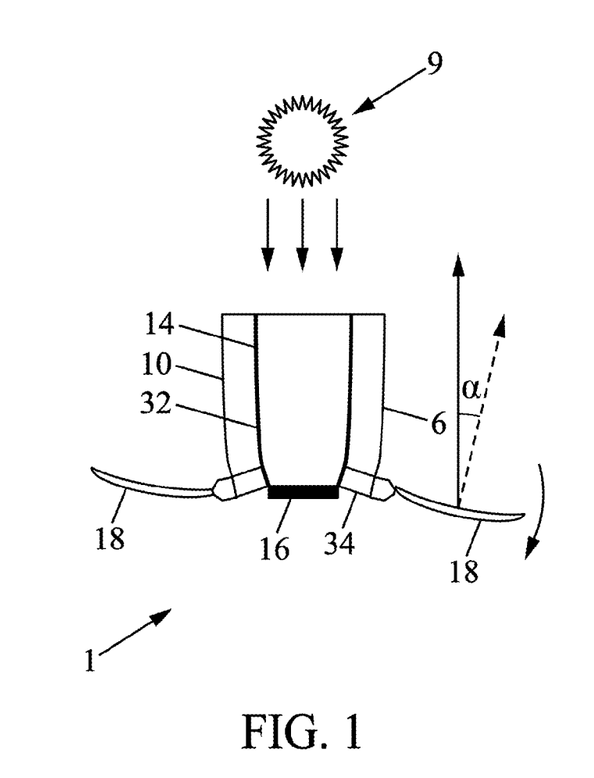
FIG. 1 is a diagrammatical view of an artificial satellite according to prior art when the launcher-adapter is positioned on the nocturnal side.
Figure 2:
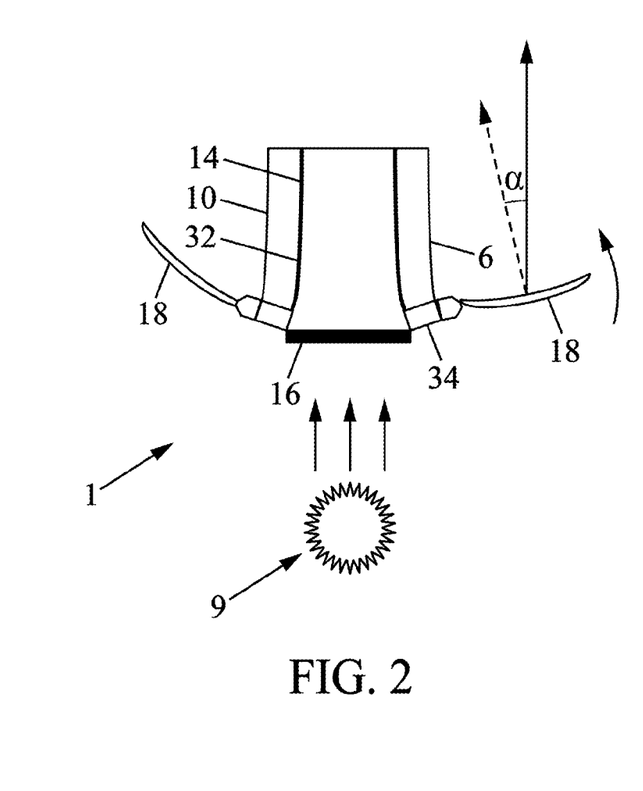
FIG. 2 is a diagrammatical view of an artificial satellite according to prior art when the launcher-adapter is positioned on the side of the sun.
Figure 4:
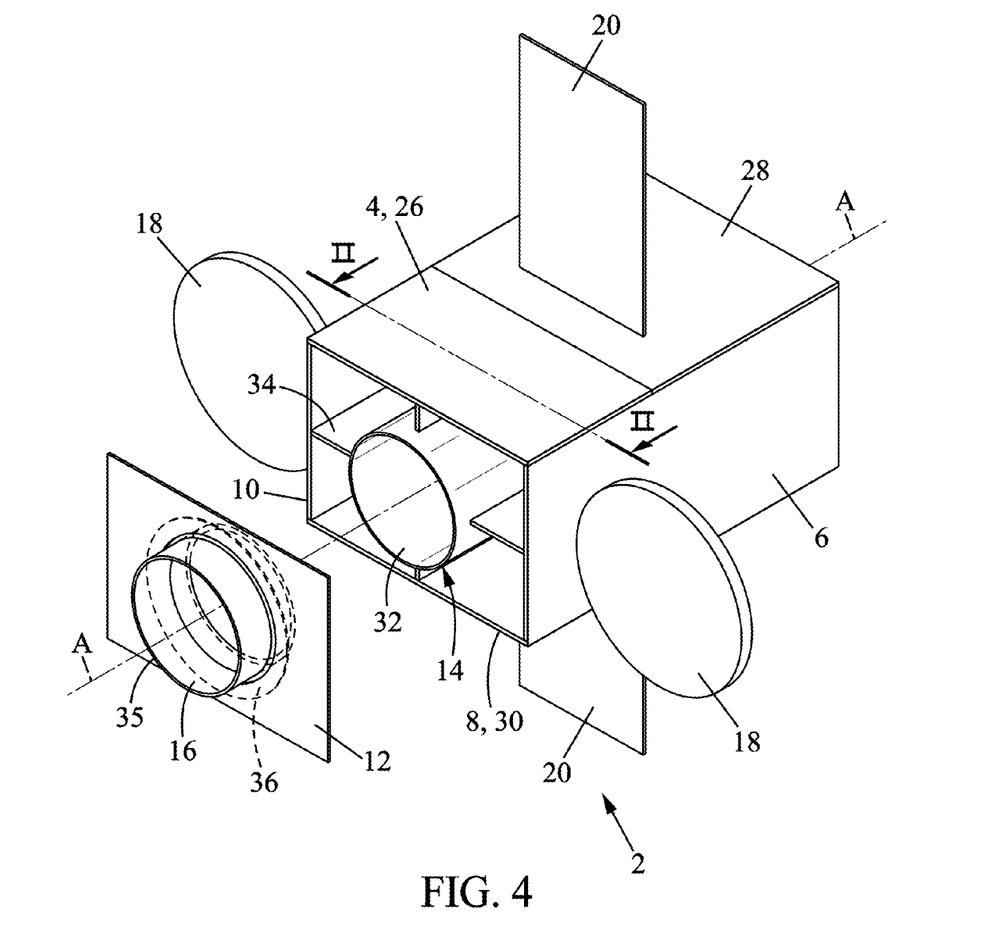
FIG. 4 is a perspective exploded view of an artificial satellite according to a first embodiment of the invention.

The known artificial satellites 1, diagrammatically shown in the FIGS. 1, 2 and 4, are generally formed by a mounting structure 14 supporting six flat equipment-bearing walls 6, 10 forming a cubical or parallelepiped equipment case. Antenna reflectors 18 are fastened to the base of the flat equipment-bearing walls 6, 10 or directly on the structure-support. A launcher-adapter 16 (commonly referred to using the acronym LVA (Launch Vehicle Adaptor)) is directly fixed to the base of the mounting structure 14. This launcher-adapter is intended to be removable rigidly connected to an additional adapter rigidly connected to a launcher of the satellite. The launcher-adapter 16 is released from the additional adapter of the launcher, when the satellite is jettisoned at the end of the propulsive phase of the launcher.

Figure 3:
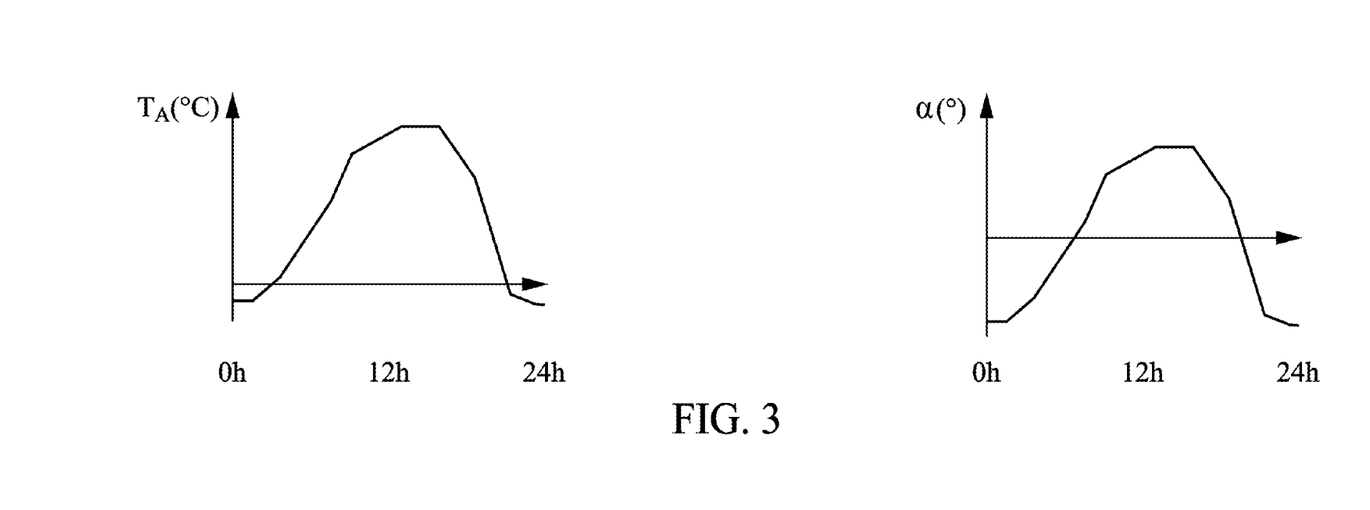
FIG. 3 is two curves representing, one the temperature of the launcher-adapter of a satellite of prior art as a function of time, the other, the mispointing of these antenna reflectors as a function of time.

The mounting structure 14 must be both very light and resist the launching by withstanding several g's of static acceleration. It is therefore generally made from carbon fibre. This material is very solid and has a thermal expansion coefficient close to zero in such a way that the mounting structure is hardly deformed. On the contrary, the launcher-adapter 16 is made of aluminium. This material is able to withstand a substantial local during the launch. But, this material has a high thermal expansion coefficient. However, in station, the launcher-adapter 16 is periodically subjected to variations in temperature that can reach 60° C. during successive passes on the side of the sun 9 on the nocturnal side. Consequently, the launcher-adapter 16 contracts at midnight in local solar time (Cf. FIG. 1) and expands at noon in local solar time (Cf. FIG. 2). As the launcher-adapter 16 is fastened directly onto the mounting structure 14, these dilatations and these contractions cause deformation to the mounting structure and the base of the flat equipment-bearing walls 6, 8. These deformations cause periodical mispointings of the antenna reflectors 18. FIG. 3 shows the variation in the temperature TA of the launcher-adapter 16 over the course of time as well as the mispointing a of the antenna reflectors 18 that result.

In order to avoid these mispointings, it is possible to fasten the antenna reflectors at a greater distance from the launcher-adapter, for example, on a median portion of the flat equipment-bearing walls. However, this positioning reduces the focal distance of the antenna reflectors. This reduction can be constraining for their performance.

In order to avoid the mispointings, certain manufacturers have therefore developed complex mechanisms for repointing antenna reflectors. These mechanisms comprise sensors that are able to capture the mispointings, a processing unit that is able to calculate the new orientation to be given to the antenna reflectors and actuators able to redirect the antenna reflectors. However, these repointing mechanisms are not entirely satisfactory because they have difficulties in capturing the mispointings due to the absence of a fixed reference in space. In addition, they are very expensive.

The purpose of this invention is to propose an artificial satellite of which the antenna reflectors are not or are hardly mispointed and which do not have the disadvantages of existing mechanisms.

Advantageously, the artificial satellite according to the invention does not reduce the focal distance of the antenna reflectors.

Advantageously, the artificial satellite according to the invention is less expensive than satellites provided with a mechanism for re-pointing and are more reliable over time.

To this effect, the invention has for object an artificial satellite that has a longitudinal axis that extends in the launch direction, said artificial satellite comprising:
  a mounting structure supporting equipment-bearing walls,
  a launcher-adapter rigidly connected to the mounting structure,
  a first radiator,
  at least one first system for transporting heat by a fluid comprising at least one first heat-exchange section and a second heat-exchange section, said second heat-exchange section being in thermal contact with said first radiator, characterised in that said first heat-exchange section is in thermal contact with at least one portion of the launcher-adapter in such a way as to allow for heat exchanges between the launcher-adapter and the first radiator.

According to particular embodiments, the artificial satellite comprises one or several of the following characteristics:
  it comprises a profile rigidly connected to the launcher-adapter, said profile extending in a plane perpendicular to the longitudinal axis of the satellite, and wherein said profile supports and is in direct thermal contact with at least one portion of the first heat-exchange section.
  An equipment-bearing wall, referred to as anti-Earth equipment-bearing wall, is fastened to the launcher-adapter by the intermediary of said profile.
  At least one portion of the first heat-exchange section is in thermal contact direct with an equipment-bearing wall, referred to as anti-Earth equipment-bearing wall; said anti-Earth equipment-bearing wall being fastened to the launcher-adapter.
  It comprises a profile rigidly connected to the launcher-adapter, said profile extending in a plane perpendicular to the longitudinal axis of the satellite.
  The first heat-exchange section comprises several sections fastened to one another in such a way as to form a half-polygon or a polygon.
  The first heat-exchange section has the shape of a half-circle or the shape of a circle.
  The first system for transporting heat comprises a main duct in the shape of an omega and at least one auxiliary duct in the shape of an L; at least one portion of the main duct forming said first heat-exchange section, at least one portion of the auxiliary duct forming said second heat-exchange section.
  It comprises a tank of propellant gas and wherein the launcher-adapter is a cylindrical body; said tank of propellant gas being arranged inside said cylindrical body; said tank being in thermal contact with the launcher-adapter.
  The tank is mounted directly on the launcher-adapter.
  It comprises at least one second system for transporting heat by a fluid; said second system for transporting heat comprising a first section and a second section; said second section being in thermal contact with said first radiator and said first section being in thermal contact with a set of electrical accumulators.
  It comprises an adhesive strap made from a thermally conductive material; said adhesive strap being rigidly connected, on the one hand, to the first heat-exchange section and, on the other hand, to at least one portion of said profile.

The first heat-exchange section comprises at least two heat pipes arranged, one next to the other, along a direction perpendicular to the longitudinal axis of the satellite.

The first heat-exchange section comprises at least two heat pipes arranged one next to the other, along a direction parallel to the longitudinal axis of the satellite.

The first system for transferring heat comprises at least one heater in thermal contact with the second heat-exchange section, and a control unit that can control the turning on of said at least one heater.

Before launching, the tank of the satellite must be filled with propellant. When the propellant is a gas such as xenon, the operation of filling the tank generates an increase in the pressure of the gas in the tank. The increase in this pressure generates an increase in the temperature of the gas and of the tank. Consequently, it is necessary to limit the filling speed. As such, every time a small quantity of gas is introduced into the tank, it is necessary to wait for the tank to cool to an ambient temperature before being able to again introduce a small quantity of gas. This method has to be repeated several times in order to entirely fill the tank. The cooling time of the tank is therefore substantial. The tank is generally installed inside the satellite and is thermally insulated from the exterior. Consequently, the cooling of the tank is extremely slow in such a way that the method for filling the tank can take several days. In order to decrease the duration for this filling, it is possible to blow cool air inside the satellite in order to assist in cooling the tank. However, the introduction of cool air coming from a ventilation system can bring particles and contaminants inside the satellite.

The invention also has for object a method for filling a tank of the artificial satellite mentioned hereinabove. This method comprises the following steps:
cooling the tank by the first radiator; and
filling the tank with propellant.

Advantageously, according to the invention, there is a substantial thermal coupling between the tank and the radiator. Consequently, it is now possible to cool the tank by bringing cool air into the outer radiators. As such, no contaminant is introduced inside the satellite. The duration for filling the tank can be reduced substantially. During this method for filling the tank, the heaters will of course be turned off.

The invention will be understood better when reading the following description, provided solely by way of example and given in reference to the figures wherein.

Figure 5:
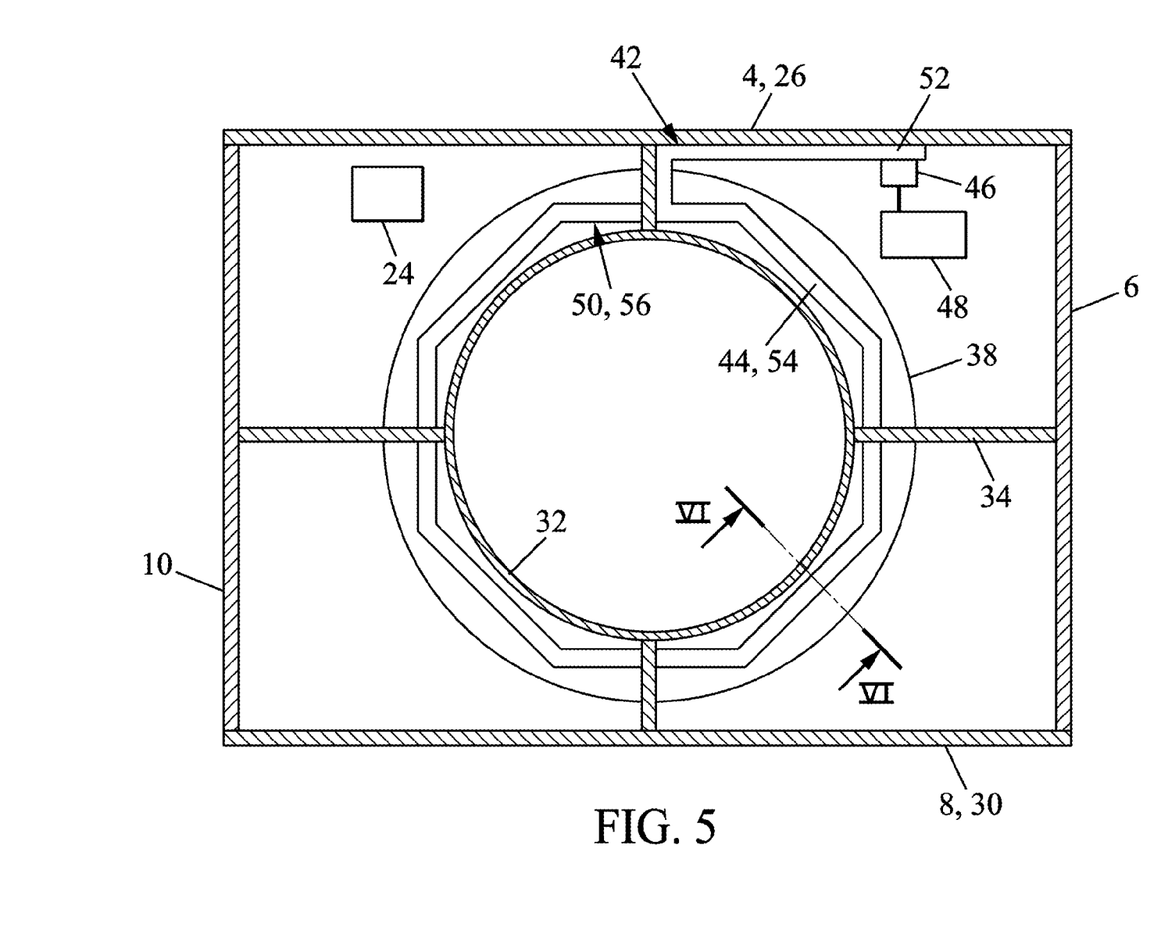
FIG. 5 is a cross-section top view, of a lower portion of the artificial satellite shown in FIG. 4.

In reference to FIGS. 4 and 5, an artificial satellite 2 according to the first embodiment of the invention has a longitudinal axis A-A that extends in the launch direction. It comprises flat equipment-bearing walls 4, 6, 8, 10, 12 able to support equipment, a mounting structure 14 supporting said equipment-bearing walls and a launcher-adapter 16 rigidly connected to the mounting structure 14.

The equipment includes in particular antenna reflectors 18, electronic equipment (not shown), powered by solar panels 20 and at least one ensemble of electrical accumulators 24.

The antenna reflectors 18 are fastened to the base of the equipment-bearing walls 6, 10 of the East and West surfaces. Solar panels 20 are mounted on the equipment-bearing walls of the North 4 and South 8 surfaces. The equipment-bearing wall of the North surface 4 is provided with a first radiator 26 and with a second radiator 28. The equipment-bearing wall of the South surface 8 is provided with a third radiator 30.

The mounting structure 14 and the launcher-adapter 16 can be formed in different ways. Only an example of the forming shown in FIG. 4 shall be described in a detailed manner. The example of the mounting structure shown in FIG. 4, comprises a central cylinder 32 and four fins 34 fastened, each one, on the one hand, to the central cylinder 32, and on the other hand to an equipment-bearing wall 4, 6, 8, 10.

The example of the launcher-adapter 16 shown in FIGS. 4 to 7 has the form of a ring. It is formed by a cylindrical body 35 having a circular base. The centre of the circular base is arranged on the longitudinal axis A-A of the satellite. The cylindrical body 35 is rigidly connected to the lower portion of the central cylinder 32 of the mounting structure.

The equipment-bearing wall 12 that extends perpendicularly to the longitudinal axis A-A of the side of the launcher, referred to as anti-Earth equipment-bearing wall 12, is fastened to the launcher-adapter 16 and to the central cylinder 32, by the intermediary of a profile 36 diagrammatically shown in FIGS. 4, 7, 8 and 9. The profile 36 has a section in the shape of a bracket. This bracket has a first branch 38 fastened to the launcher-adapter and to the central cylinder and a second branch 40 fastened to the anti-Earth equipment-bearing wall 12, for example with bolts. The first branch 38 clamps the launcher-adapter 16. The second branch 40 forms a collar that extends outwards in a plane perpendicular to the longitudinal axis A-A of the satellite.

The launcher-adapter is generally made from aluminium or an aluminium alloy. The mounting structure 14 is generally made from carbon fibre.

In reference to FIG. 5, the artificial satellite 2 comprises a first system 42 for transporting heat by a fluid able to cool or to heat the launcher-adapter 16 in order to attenuate the variations in temperature to which the latter is subjected.

The first system 42 for transporting heat by a fluid in a two-phase piece of equipment such as a heat pipe. It forms a heat exchange loop. It comprises a duct 44 containing a heat transfer fluid or several ducts 44, 45 containing heat transfer fluids, said ducts being in thermal contact two-by-two. It also comprises a heater 46 and a control unit 48 able to control the turning on of the heater.

The duct 44 comprises a first section of a heat-exchange duct 50 in thermal contact with the launcher-adapter 16 and a second section of a heat-exchange duct 52.

The first heat-exchange section 50 is comprised of several sections of straight ducts 54 fastened to one another in such a way as to form a polygon 56. This polygon 56 is arranged as close as possible to the launcher-adapter 16.

The second heat-exchange section 52 is in thermal contact on the one hand, with the first radiator 26, and on the other hand, with the heater 46. The first radiator 26 forms a heat sink or cold source. The heater 46 forms a hot source. The heater can for example be located on the inner surface of the radiator, on the ducts, or directly on the adapter. The first radiator-heater unit therefore constitutes a cold or hot thermal source.

Advantageously, the second heat-exchange section 52 is fastened on a surface of the satellite that has an orientation different from the orientation of the surface that supports the launcher-adapter. Consequently, the second heat-exchange section 50 is generally not exposed at the same time, to the same sunlight as the launcher-adapter.

Figure 6:
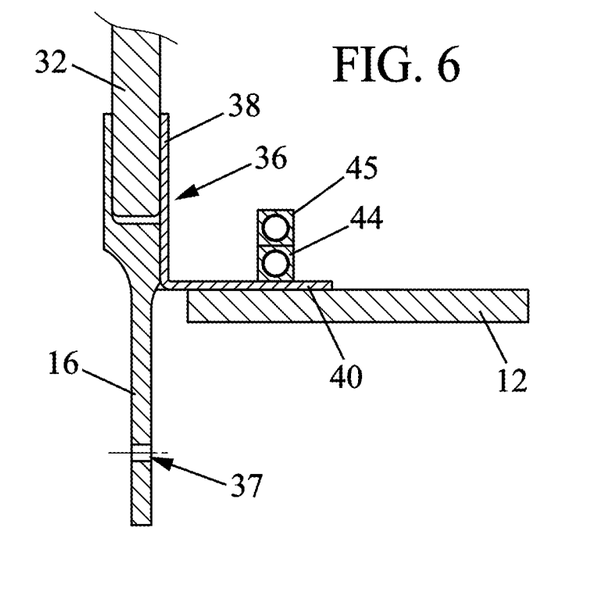
FIG. 6 is a section of the artificial satellite shown in FIG. 4, with the plane of the section being shown in FIG. 5.
Figure 7:
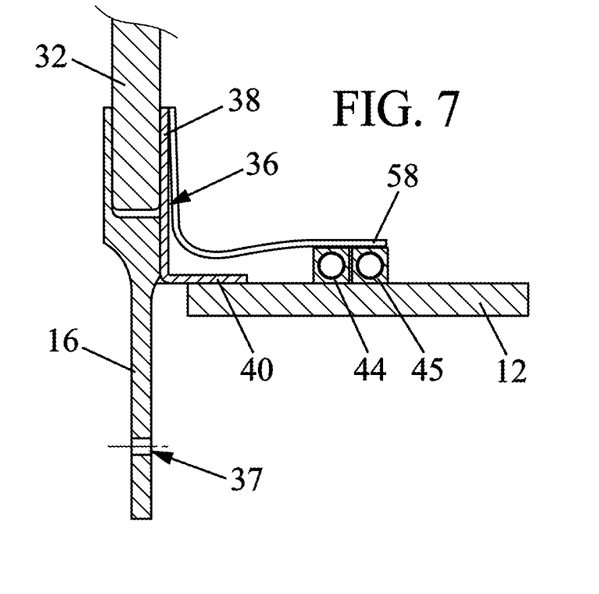
FIG. 7 is a section similar to the view of FIG. 6 of an alternative embodiment of the artificial satellite shown in FIG. 4.

FIGS. 6 and 7 show two possible arrangements of the first heat-exchange section 50.

In reference to FIG. 6, the first heat-exchange section 50 is formed by two ducts 44, 45 and, in particular, by two heat pipes. The two heat pipes 44, 45 are stacked on top of one another, along a direction parallel to the longitudinal axis A-A of the satellite. The lower heat pipe 44 is in direct physical contact with the profile 36.

In reference to FIG. 7, the first heat-exchange section 50 is formed by two ducts 44, 45 and, in particular, by two heat pipes. The two heat pipes 44, 45 are arranged next to one another, along a direction perpendicular to the longitudinal axis A-A of the satellite. In this second arrangement mode, the two heat pipes 44, 45 are in direct physical contact with the Earth equipment-bearing wall 12.

Preferentially, an adhesive thermal strap 58, made from a thermally-conductive material, such as aluminium or an aluminium alloy, is arranged on the two heat pipes 44, 45 and on the first branch 38 of the profile. It creates a thermal bridge between the latter. It improves the conducting of heat between first heat-exchange section 50 and the launcher-adapter 16.

The first system 42 for transporting heat is used for cooling or heating the launcher-adapter 16, either passively by using the "natural" orientation of the artificial satellite 2 in relation to the sun, and in particular the orientation of the launcher-adapter 16 and of the first radiator 26 in relation to the sun, or actively, for example by using the heater 46.

Figure 8:
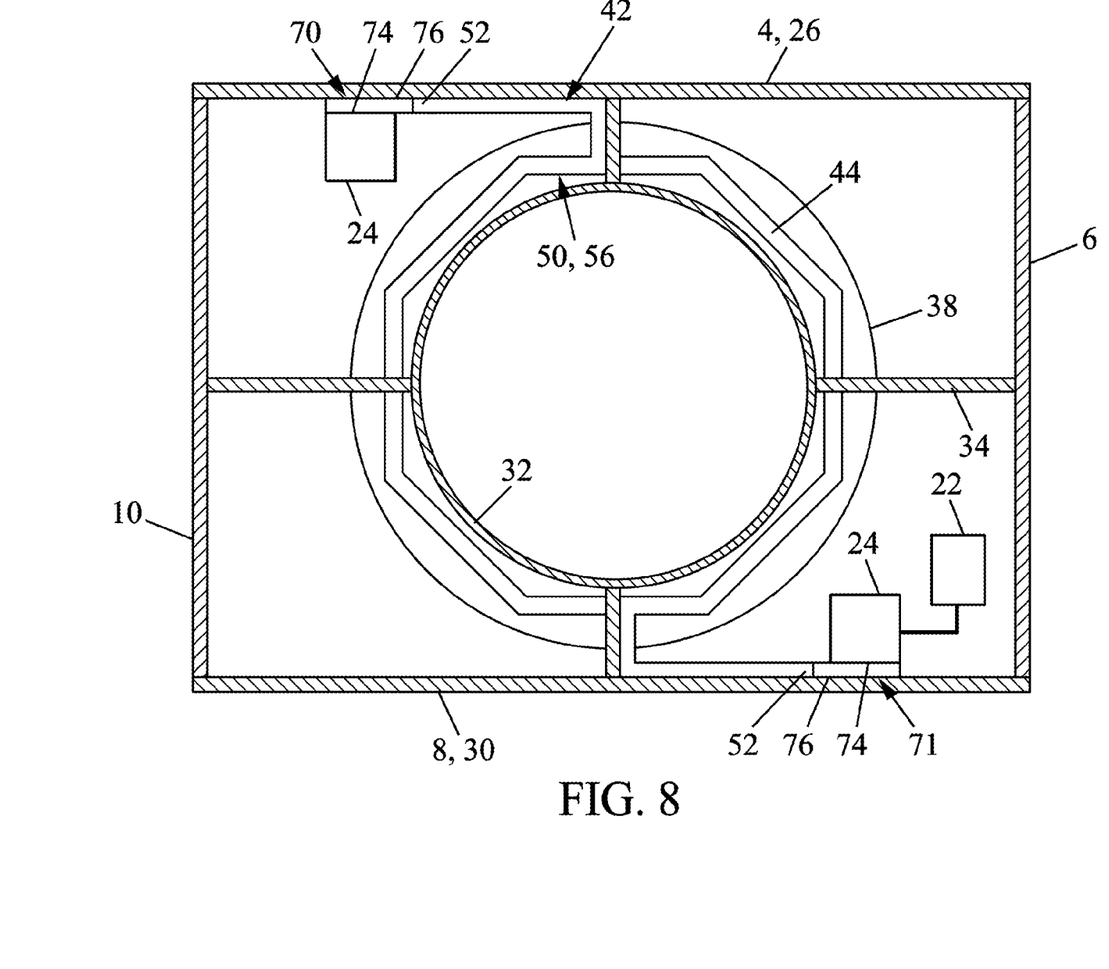
FIG. 8 is a cross-section view similar to FIG. 5 of a second embodiment of the artificial satellite according to the invention.

According to a second embodiment of the invention shown in FIG. 8, the artificial satellite 2 further comprises a second 70 and a third 71 systems for transporting heat 70, each one, able to cool a set of electrical accumulators 24, during their operation.

The second 70 and the third 71 systems for transporting heat include, each one, a duct having a first section 74 and a second section 76. The second section of the second system for transporting heat is in thermal contact with the first radiator 26. The second section 76 of the third system for transporting heat is in thermal contact with the third radiator 30.

The artificial satellite 2 shown in FIG. 8 comprises the same technical elements as the artificial satellite 2 shown in the other figures. These technical elements have been referenced using the same numerical references and are not described a second time. The heater 46 and the control unit 48 were not shown in FIG. 8 for reasons of simplification.

The embodiment of FIG. 8 makes it possible to use the first radiator 26 and the third radiator 30 pour in order to cool both the launcher-adapter 16/tank 39 unit and two electrical accumulators 24 units.

This configuration is advantageous in particular for telecommunication satellites that have an anti-Earth-oriented launcher-adapter 16. Indeed, the launcher-adapter 16 of these satellites is exposed to a maximum of sunlight at mid-day in local solar time. And as the sets of electrical accumulators 24 dissipate heat only when they are used i.e. when the satellite is in eclipse, at midnight in local solar time, the same radiator 26, 30 can dissipate the heat of the sets of electrical accumulators at midnight and the heat of the launcher-adapter 16 at mid-day. As such, a single radiator 26, 30 can be used for two functions: the cooling of the electrical accumulator units and the cooling of the launcher-adapter. The needs in terms of heating are also reduced. The heater can be the same for the controlling of the launcher-adapter and accumulators. This configuration is also advantageous for artificial satellites 2 that have a launcher-adapter 16 arranged facing east or west.

Advantageously, this configuration makes it possible to increase the performance of the radiators by carrying out a North-South thermal link between the first radiator 26 and the third radiator 30.

Figure 9:
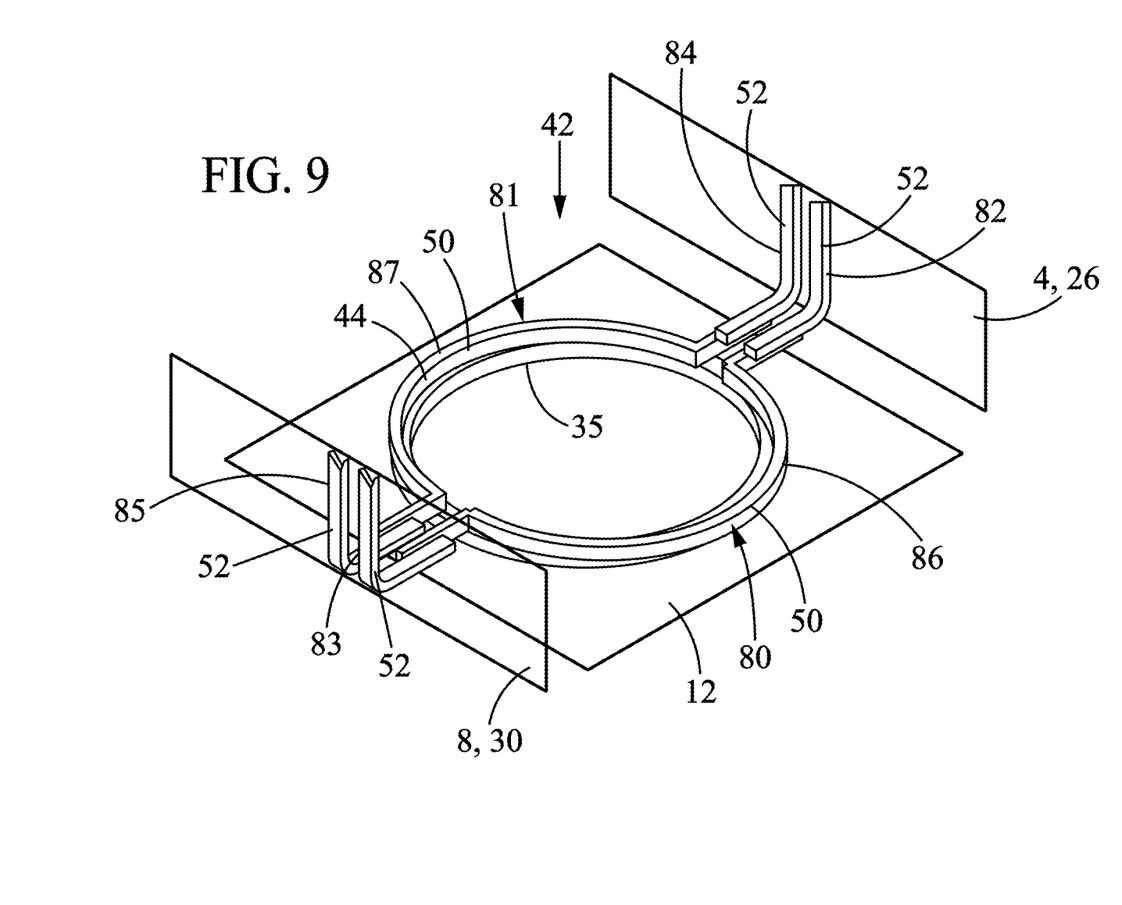
FIG. 9 is a perspective view representing a portion of a third embodiment of the artificial satellite according to the invention.

According to a third embodiment of the artificial satellite 2 according to the invention, shown in FIG. 9, the first system for transporting heat 42 comprises two main ducts 80, 81 in the shape of an omega and four auxiliary ducts 82, 83, 84, 85 in the shape of an L.

The shape of an omega is constituted by a half-circle with two linear branches. The half-circle 86 of a main duct 80 is in thermal contact with a semi-cylindrical portion of the launcher-adapter 16. A first auxiliary duct 82 is in thermal contact with a linear branch of the main duct 80 and with the first radiator 26. A second auxiliary duct 83 is in thermal contact with the other linear branch of the main duct 80 and with the third radiator 30.

The half-circle 87 of the other main duct 81 is in thermal contact with a complementary semi-cylindrical portion of the launcher-adapter 16. A third auxiliary duct 84 is in thermal contact with a linear branch of the main duct 81 and with the first radiator 26. A fourth auxiliary duct 85 is in thermal contact with the other linear branch of the main conduct 81 and with the third radiator 30.

The half-circles 86, 87 are arranged on the profile 36 or on the anti-Earth equipment-bearing wall 12. They are in thermal contact with the launcher-adapter 16. They constitute the first heat-exchange section 50. A portion of each auxiliary duct 82, 83, 84, 84 constitutes the second heat-exchange section 52.

Alternatively, the half-circles 86, 87 are replaced with half-polygons.

Alternatively, the main conduct in the shape of an omega (or half-polygon) is made of a single piece i.e. using a single duct. This alternative is advantageous for the integration since it involves only 3 flat parts which facilitates their integration.

In this embodiment, there is a north-south thermal link between the first radiator 26 and the third radiator 30, which is advantageous in terms of radiator performance. This embodiment can easily be combined with the preceding embodiment: the first radiator 26 and the third radiator 30 can be in common with the radiator of the batteries.

Figure 10:
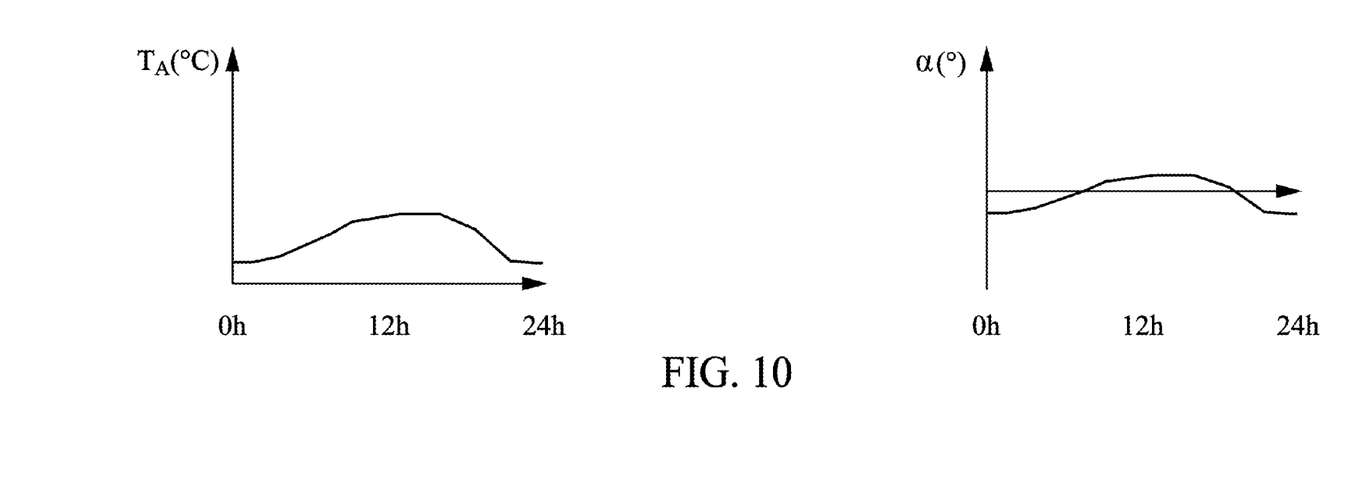
FIG. 10 is two curves representing, one the temperature of the launcher-adapter 16 of a satellite according to the invention as a function of time, the other the mispointing of the antenna reflectors as a function of time.

In operation, when the launcher-adapter 16 is oriented towards the sun at 12 h00 in local solar time, the launcher-adapter 16 is a hot source for the first system for transporting heat 42. The heat recovered by the first heat-exchange section 50 is evacuated by the first radiator 26 which is in thermal contact with the second heat-exchange section 52. The first radiator 26 cools the launcher-adapter 16. On the contrary, when the launcher-adapter 16 is oriented on the shade side, at 0 h00 in local solar time, the launcher-adapter 16 is reheated by the heater 46 via the first system for transporting heat 42. As such, the first system for transporting heat 42 makes it possible to cool the launcher-adapter 16, when the latter has a high temperature, and to heat it, when it has a low temperature. As such, as shown in FIG. 10, the range of the variation in temperature of the launcher-adapter 16 is reduced in such a way that the launcher-adapter is not or is hardly deformed. The mispointings a of the antenna reflectors 18 are as such lessened, and even suppressed.

An example of a value for the heat exchange between the launcher-adapter and the first radiator can be estimated by the calculation hereinafter.

The objective is, for example, to limit the variations in temperature of the launcher-adapter to 20° C.+/−10° C. As such, the maximum temperature of the launcher-adapter must not be greater than 30° C. (303 K) when the launcher-adapter is in the sun, and must not be less than 10° C. (283 K) when the launcher-adapter is in the shade. The exposed portion of the cylindrical body 35 can be assimilated as a ring of 1.66 meters in outer diameter and 1.56 meters in inner diameter. The surface exposed to the sun (Surf.) is equal to 0.254 m². The surface coating is in general a hard coating, for example a hard anodising coating such as the alocrom brand, with a solar absorption coefficient ($\alpha s$) approximately equal to 0.5 and an infrared emissivity ($\epsilon IR$) approximately equal to 0.1. When the launcher-adapter is exposed to the sun, it absorbs the heat $Q_{sol}$.

$$Q_{sol} = F_{sol} \times \alpha s \times \text{Surf.}$$

$$Q_{sol} = 1,427 \text{ W/m}^2 \times 0.5 \times 0.254 \text{ m}^2 = 181 \text{ W.}$$

Wherein $F_{sol}$ is the average solar flux.

A portion $Q_{rad}$ of this heat $Q_{sol}$ is directly radiation in the space $Q_{rad}$.

$$Q_{rad} = \epsilon IR \times \text{Surf.} \times \sigma \times T^4$$

$$Q_{rad} = 12 \text{ W.}$$

Wherein $\sigma$ is the Stefan-Boltzmann constant
And T is the temperature

The quantity of heat to be evacuated by the heat pipe system is then $Q_{sol} - Q_{rad} = 169$ W. When the launcher-adapter is in the shade, the quantity of heat coming from the sun and absorbed by the launcher-adapter is zero, the cylindrical body 35 irradiated less energy to space (as the temperature is lower). In this case, $$Q_{rad} = \epsilon IR \times \text{Surf.} \times \sigma \times T^4$$

$$Q_{rad} = 9 \text{ W.}$$

The first radiator 26 and heater unit can be controlled to a constant temperature of typically 13° C. The first radiator is sized to reject the quantity of heat when the launcher-adapter is fully exposed to the sun, the control unit and the heater can then be implemented in order to progressively supply heat as the launcher-adapter passes into the shade.

In this case, the difference in temperature between the launcher-adapter and the first radiator is 17° C. when the launcher-adapter is fully exposed to solar radiation, and −3° C. when the launcher-adapter is located in the shade.

The minimum thermal coupling required is then determined by the quantity of heat to be evacuated divided by the temperature gradient. When the launcher-adapter is exposed in full sunlight, the thermal coupling is −169 W/17° C.=10 W/K. When the launcher-adapter is in the shade, the thermal coupling is −12 W/3=4 W/K.

As such, a thermal coupling of about 10 W/K between the launcher-adapter and the first radiator 26 is required to reach a temperature of 20° C.+/−10° C. over the cylindrical body 35 of the launcher-adapter. Such a value can easily be obtained by using heat pipes or other systems for transporting fluidic heat. This calculation is an indication—the exact value will depend on the actual dimension of the cylindrical body of the launcher-adapter, and of the thermal-optical coating installed on the surface of the cylindrical body of the launcher-adapter.

Figure 11:
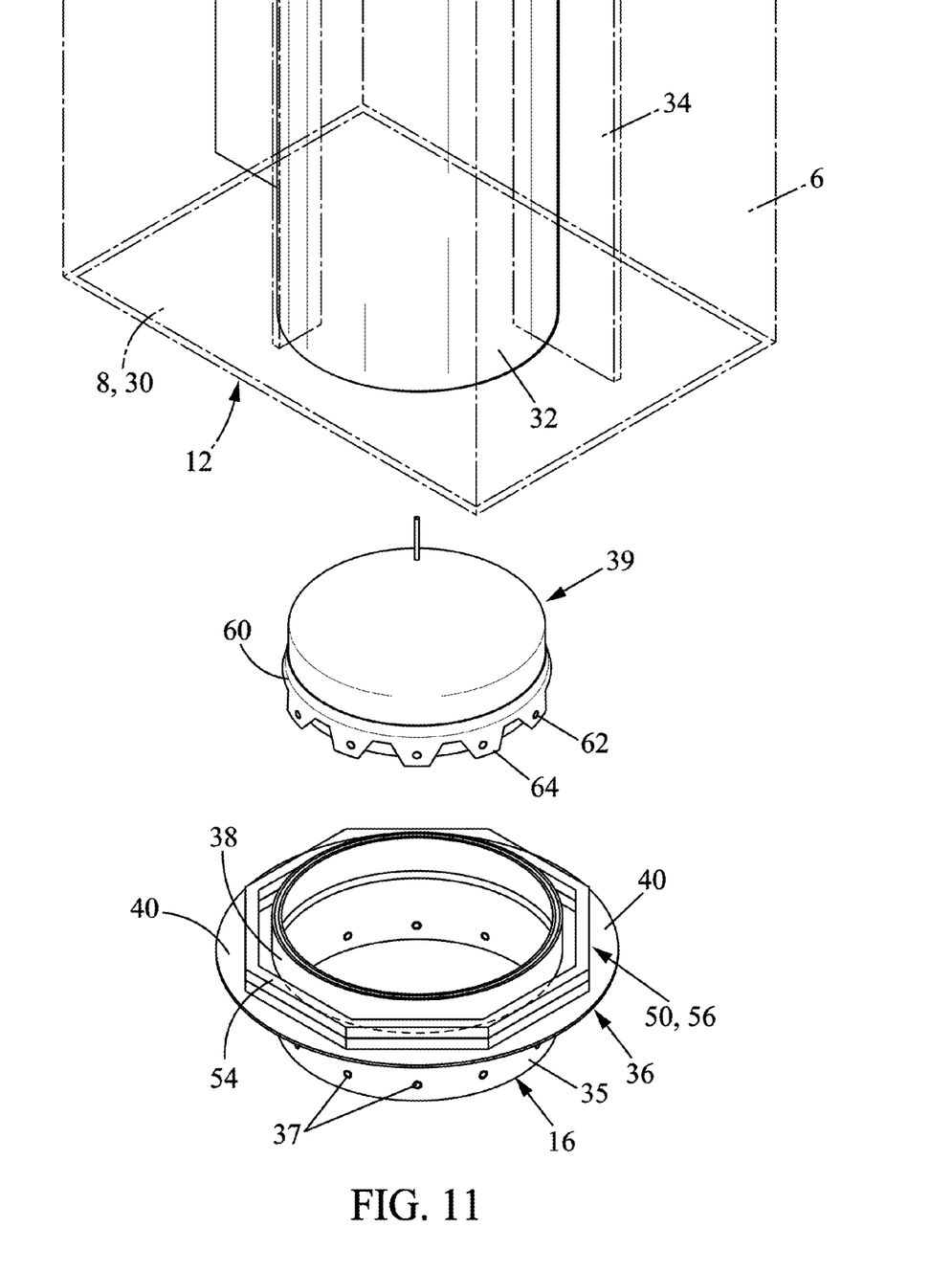
FIG. 11 is an exploded perspective view of a fourth embodiment of the artificial satellite according to the invention wherein a tank is mounted.

An artificial satellite 2 according to a fourth embodiment of the invention is similar to the artificial satellite according to the first embodiment with the exception of the fact that the cylindrical body 35 of the launcher-adapter comprises a succession of orifices 37 intended for the fastening of a tank 39 containing a propellant gas. The succession of orifices 37 extend along a circle contained in a plane perpendicular to the longitudinal axis A-A.

The tank 39 is mounted inside the lower portion of the housing created by the central cylinder 32. It is fastened to the launcher-adapter 16 by the intermediary of a fastening skirt 60 that encircles the tank. The lower portion of the fastening skirt is provided with a serration 62 provided with orifices 64. The tank 39 is, for example, fastened to the launcher-adapter 16 by nuts mounted in the orifices 64 of the fastening skirt and in the orifices 37 of the launcher-adapter 16.

The tank 39 contains a gas or a propulsive liquid or propellant, such as for example xenon or a gas containing xenon. From a mechanical standpoint, it is advantageous to install the tank as low as possible in the satellite: this makes it possible to reduce the height of the centre of gravity and as such makes it possible to reduce the forces at launching, which allows for a lighter and less expensive structure. Ideally, the tank should be mounted on the launcher-adapter.

Advantageously, the cooling of the launcher-adapter 16 makes it possible to mount the tank 39 in the latter.

However, the quantity of propellant that can be stored in the tank 39 depends on the temperature of this propellant.

For example, if we consider the example of a tank that has a fixed volume $V_{res}$ and containing a perfect gas that satisfies the equation of state pV=nRT, the quantity of n that can be stored is then equal to n=pV/RT. However, the pressure is limited by the volume of the tank to a maximum pressure $p_{max}$ above which there is a risk of explosion. As such, the maximum quantity of gas that can be stored is given by the following equation: $n = p_{max} V_{res}/RT$. This quantity is inversely proportional to the maximum temperature of the tank. Consequently, if the tank is exposed to high temperatures, then the quantity of gas stored in the tank must be reduced in such a way as to remain less than the maximum allowable pressure $p_{max}$.

In this example, when the propellant is a perfect gas, a reduction in the temperature from 60° C. (333K) to 20° C. (293K) makes it possible to increase the quantity of gas stored by 13%.

However, the propellants used in satellites are generally not perfect gases and the reduction in temperature of the propellant makes it possible to more substantially increase the quantity of gas stored. For example, when xenon is used as propellant, the tank has a volume of 1 m$^3$ and the maximum pressure $p_{max}$ is equal to 100 bars. At a temperature of 60° C., the maximum mass of xenon that can be injected in the tank would be 900 kg, while at a temperature of 20° C., the maximum mass of Xenon that can be injected is 1850 kg. Consequently, the increase in the mass of xenon introduced is greater than 100%.

In addition, certain liquid propellants are not compatible with high temperatures due to problems of chemical breakdown.

As the tank 39 is mounted inside the launcher-adapter 16, there is a substantial thermal coupling between the latter in such a way that the tank will tend to have the same temperature as the launcher-adapter 16. Indeed, even if an attempt is made to thermally insulate the tank from the launcher-adapter, the support structure of the tank 64 has to be rigidly linked, to the launcher-adapter and to the tank, as such creating a thermal connection. The mechanical needs are such that in practice it is difficult to have a thermal coupling that is less than 0.5 W/K between the tank and the launcher-adapter.

In any case, the effect of such an insulation is solely to reduce the transient thermal response of the tank. If the launcher-adapter 16 is hot for several days, this insulation has a minimum effect on the tank in stable state at a stabilised temperature. During certain phases of the mission, the launcher-adapter 16 is constantly illuminated by the sun for several days, and becomes very hot—generally 70° C. In these cases, the temperature of the tank tends to be identical to the temperature of the launcher-adapter. Such a temperature is too high for the storage of propellant gas. It is then not possible to mount a tank directly on the launcher-adapter 16.

The invention makes it possible to install a tank directly on the central cylinder 32 of the launcher-adapter 16. The maximum temperature of the central cylinder 32 of the launcher-adapter is brought to a lower level, and consequently the stabilised temperature of the tank is reduced to within the acceptable limits for the storage of the propellant agent. The temperature of the tank remains acceptable, even if the thermal coupling between the tank and the launcher-adapter 16 is increased. As such, the first system for transporting heat 42 is also used to cool and control the temperature of the tank 39.

Figure 12:
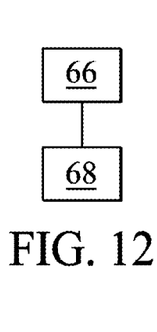
FIG. 12 is a diagram representing the steps of the method according to the invention.

Finally, the first system for transporting heat 42 is advantageously used to cool the tank 39, during its filling. To this effect, during a step 66 that can be seen in FIG. 10, the first radiator 26 cools the tank 39 by the intermediary of the launcher-adapter 16. Then, during a step 68, the tank 39 is filled with gas. During the step of filling 68, the first radiator 26 continues to cool the tank 39 in order to increase the filling capacity of the tank 39 or decrease the filling time of the latter.

The steps 66 and 68 can be repeated several times.

Advantageously, the cooling of the second heat-exchange section 52 makes it possible to cool the launcher-adapter 16 and, by contact, the tank 39 fastened to the latter. The cooling of the tank 39 makes it possible to cool the gas injected into the tank. This cooling opposes the natural heating of the gas linked to its compression during the injection.

As indicated plus haut, the temperature of the propulsion agent in flight does not depend substantially on the thermal coupling between the tank and the launcher-adapter. The mechanical installation of the tank can then be designed with a strong thermal coupling in such a way as to maximise the effect of the cooling during the filling. As indicated hereinabove, this thermal coupling is favoured if the tank is mounted directly on the launcher interface; i.e. without an intermediary part.

As such, the filling of the tank 39 is more secure and can be carried out faster. In addition, the cooled tank 39 makes it possible to store a more substantial quantity of gas for the reasons mentioned hereinabove.

Alternatively, the profile is formed of a single piece with the launcher-adapter.

Also alternatively, the profiler extends towards the inside of the cylinder of the launcher-adapter. In this case, the tank is not mounted in the launcher-adapter.

Alternatively, the radiator in contact with the system or systems for transporting heat 42, 70, 71 is arranged on the South surface, the East surface, the West surface, the Earth surface or the anti-Earth surface of the satellite.

Alternatively, the North equipment-bearing wall comprises a single radiator which can be used both for the first 70 and the second 71 systems for transporting heat.

Alternatively, the first heat-exchange section is circular.

Alternatively, it can be considered to combine the various possibilities of the two modes of arrangement shown in FIGS. 6 and 7. For example, as an alternative to the first arrangement, it is possible to arrange the two heat pipes 44, 45, one next to the other, on and in direct contact with the profile 36. Likewise, it is possible to arrange an adhesive strap 58 on the two heat pipes 44, 45 stacked and on the first branch 38 of the profile. It can also be considered to arrange the two heat pipes 44, 45 stacked on the Earth equipment-bearing wall 12.

Alternatively, the second heat-exchange section 52 of the duct 44 in in thermal contact with the first radiator 26 and the third radiator 30.

Alternatively, the first system 42 for transporting heat by a fluid is a single-phase or three-phase piece of equipment.

Alternatively, the launcher-adapter can have a cylindrical shape with a square base or with a rectangular base or with a polygon base of which the centre is arranged on the longitudinal axis of the satellite.

Alternatively, the mounting structure can have different forms and in particular a tapered shape or the shape of a cup with facets with a central stack or be comprised of panels assembled in the shape of a cross or even comprised only of a flat equipment-bearing wall that extends perpendicularly to the longitudinal axis A-A of the satellite.

The invention claimed is:

1. Artificial satellite (2) having a longitudinal axis (A-A) that extends in the launch direction, said artificial satellite (2) comprising:—a mounting structure (14) supporting equipment-bearing walls (4, 8, 6, 10, 12),—a launcher-adapter (16) rigidly connected to the mounting structure (14),—a first radiator (26),—at least one first system (42) for transporting heat by a fluid comprising at least one first heat-exchange section (50) and a second heat-exchange section (52), said second heat-exchange section (52) in thermal contact with said first radiator (26), wherein said first heat-exchange section (50) is in thermal contact with at least one portion of the launcher-adapter (16) to allow for heat exchanges between the launcher-adapter (16) and the first radiator (26).

2. Artificial satellite (2) according to claim 1, that comprises a profile (36) rigidly connected to the launcher-adapter (16), said profile (36) extending in a plane perpendicular to the longitudinal axis (A-A) of the satellite, and wherein said profile (36) supports and is in thermal contact direct with at least one portion of the first heat-exchange section (50).

3. Artificial satellite (2) according to claim 2, wherein an equipment-bearing wall, referred to as anti-Earth equipment-bearing wall (12), is fastened to the launcher-adapter (16) by the intermediary of said profile (36).

4. Artificial satellite (2) according to claim 1, wherein at least one portion of the first heat-exchange section (50) is in thermal contact direct with an equipment-bearing wall, referred to as anti-Earth equipment-bearing wall (12); said anti-Earth equipment-bearing wall (12) fastened to the launcher-adapter (16).

5. Artificial satellite (2) according to claim 4, that comprises a profile (36) rigidly connected to the launcher-adapter (16), said profile (36) extending in a plane perpendicular to the longitudinal axis (A-A) of the satellite (2).

6. Artificial satellite (2) according to claim 1, wherein said first heat-exchange section (50) comprises several sections (54) fastened to one another to form a half-polygon or a polygon (56).

7. Artificial satellite (2) according to claim 1, wherein said first heat-exchange section (50) has the shape of a half-circle (86, 87) or the shape of a circle.

8. Artificial satellite (2) according to claim 1, wherein the first system for transporting heat (42) comprises a main duct (80, 81) in the shape of an omega and at least one auxiliary duct (82, 83, 84, 85) in the shape of an L; at least one portion of the main duct (80, 81) forming said first heat-exchange section (50), at least one portion of the auxiliary duct (82, 83, 84, 85) forming said second heat-exchange section (52).

9. Artificial satellite (2) according to claim 1, which comprises a tank (39) of propellant gas and wherein the launcher-adapter (16) is a cylindrical body (35); said tank (39) of propellant gas arranged inside said cylindrical body (35); said tank (39) in thermal contact with the launcher-adapter (16).

10. Artificial satellite (2) according to claim 9, wherein the tank (39) is mounted directly on the launcher-adapter (16).

11. Artificial satellite (2) according to claim 1, further comprising at least one second system for transporting heat (70, 71) by a fluid; said second system for transporting heat (70, 71) comprising a first section (74) and a second section (76); said second section (76) in thermal contact with said first radiator (26) and said first section (74) in thermal contact with a set of electrical accumulators (24).

12. Artificial satellite (2) according to claim 2, that comprises an adhesive strap (58) made from a thermally-conductive material; said adhesive strap (58) rigidly connected, both to the first heat-exchange section (50) and, as well as to at least one portion of said profile (36).

13. Artificial satellite (2) according to claim 1, wherein the first heat-exchange section (50) comprises at least two heat pipes (44, 45) arranged, one next to the other, along a direction perpendicular to the longitudinal axis (A-A) of the satellite.

14. Artificial satellite (2) according to claim 1, wherein the first heat-exchange section (50) comprises at least two heat pipes (44, 45) arranged one next to the other, along a direction parallel to the longitudinal axis (A-A) of the satellite.

15. Artificial satellite (2) according to claim 1, wherein the first system for transferring heat (42) comprises at least one heater (46) in thermal contact with the second heat-exchange section (52), and a control unit (48) able to control the turning on of said at least one heater (46).

16. Method of filling a tank (39) of an artificial satellite (2) according to claim 1; further comprising the following steps:
cooling (66) of the tank (39) by the first radiator (26); and
filling (68) of the tank (39) with propellant.

17. Artificial satellite (2) according to claim 2, wherein said first heat-exchange section (50) comprises several sections (54) fastened to one another to form a half-polygon or a polygon (56).

18. Artificial satellite (2) according to claim 3, wherein said first heat-exchange section (50) comprises several sections (54) fastened to one another to form a half-polygon or a polygon (56).

19. Artificial satellite (2) according to claim 4, wherein said first heat-exchange section (50) comprises several sections (54) fastened to one another to form a half-polygon or a polygon (56).

20. Artificial satellite (2) according to claim 5, wherein said first heat-exchange section (50) comprises several sections (54) fastened to one another to form a half-polygon or a polygon (56).

\* \* \* \* \*